Feb. 26, 1935.  W. SYKES  1,992,553
WELDING APPARATUS
Filed May 7, 1932   6 Sheets-Sheet 1

INVENTOR-
Wilfred Sykes
BY
Clarence Kerr
ATTORNEY-

Feb. 26, 1935. W. SYKES 1,992,553
WELDING APPARATUS
Filed May 7, 1932 6 Sheets-Sheet 2

INVENTOR-
Wilfred Sykes
BY Clarence A Kerr
ATTORNEY

Feb. 26, 1935.  W. SYKES  1,992,553
WELDING APPARATUS
Filed May 7, 1932   6 Sheets-Sheet 3

INVENTOR-
Wilfred Sykes
BY
Clarence Kerr
ATTORNEY-

Feb. 26, 1935. W. SYKES 1,992,553
WELDING APPARATUS
Filed May 7, 1932 6 Sheets-Sheet 4

INVENTOR-
Wilfred Sykes
BY
Clarence S. Kerr
ATTORNEY-

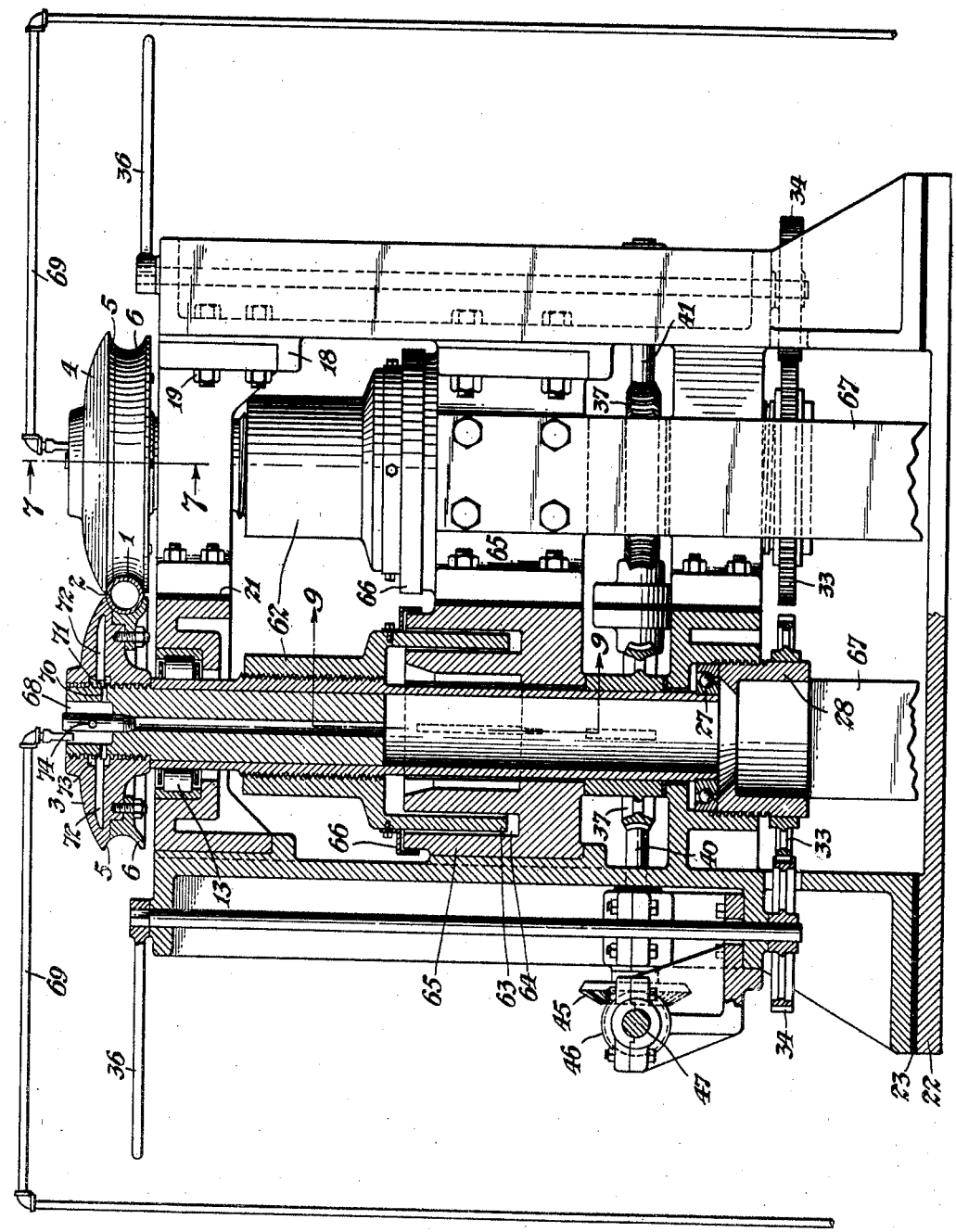

Feb. 26, 1935.   W. SYKES   1,992,553
WELDING APPARATUS
Filed May 7, 1932   6 Sheets-Sheet 6
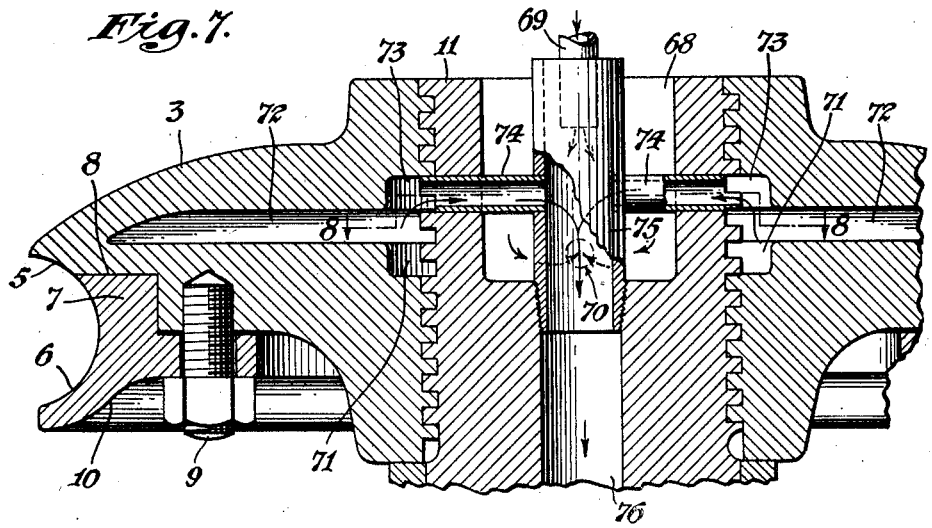
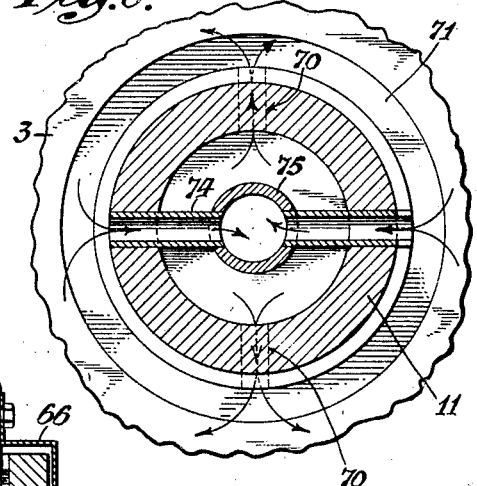
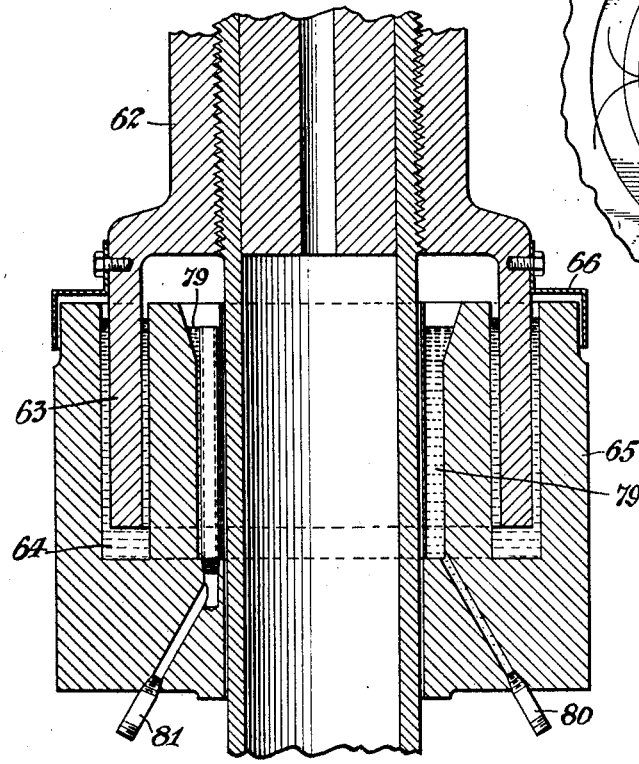
INVENTOR-
Wilfred Sykes
BY
Clarence D. Kerr
ATTORNEY- Patented Feb. 26, 1935

1,992,553

UNITED STATES PATENT OFFICE 1,992,553

WELDING APPARATUS

Wilfred Sykes, Chicago, Ill., assignor, by mesne assignments, to Direct Current Welding Company, a corporation of Delaware Application May 7, 1932, Serial No. 609,782

13 Claims. (Cl. 219—6)

This invention relates to improvements in electric butt welding apparatus in which welding rolls are arranged on opposite sides of the seam cleft in the pipe, or tube blank to be welded, and the necessary heating effect is obtained by passing electric current between corresponding electrode portions of the rolls and across the seam cleft.

One of the features of the invention resides in provisions for reducing the leakage current flowing around instead of across the seam cleft. My invention provides a construction wherein the tube supporting portions of the rolls are composed of metal having an electrical resistance many times that of the electrode portions and possessing strength and wearing qualities not attainable in constructions wherein the tube supporting portions are composed of insulating material.

Another object of the invention is to provide improved means for introducing currents to the welding units, and, as these currents may generate considerable heat adjacent the location where they are introduced to the welding units, a convenient arrangement for removing the excess heat is disclosed herein. Likewise, the welding rolls become too hot unless means are provided for removing the excess heat. A preferred arrangement for such means is also described.

In order to insure that the abutting edges of the seam cleft may be brought into proper alinement for various conditions encountered in actual practice, it is desirable to provide means for independently adjusting the height of the rolls with respect to each other. A preferred arrangement for accomplishing this adjustment is also disclosed herein.

Further objects of the invention will be apparent, and the invention will be better understood by reference to the following description and the accompanying drawings, in which.

Figure 4:
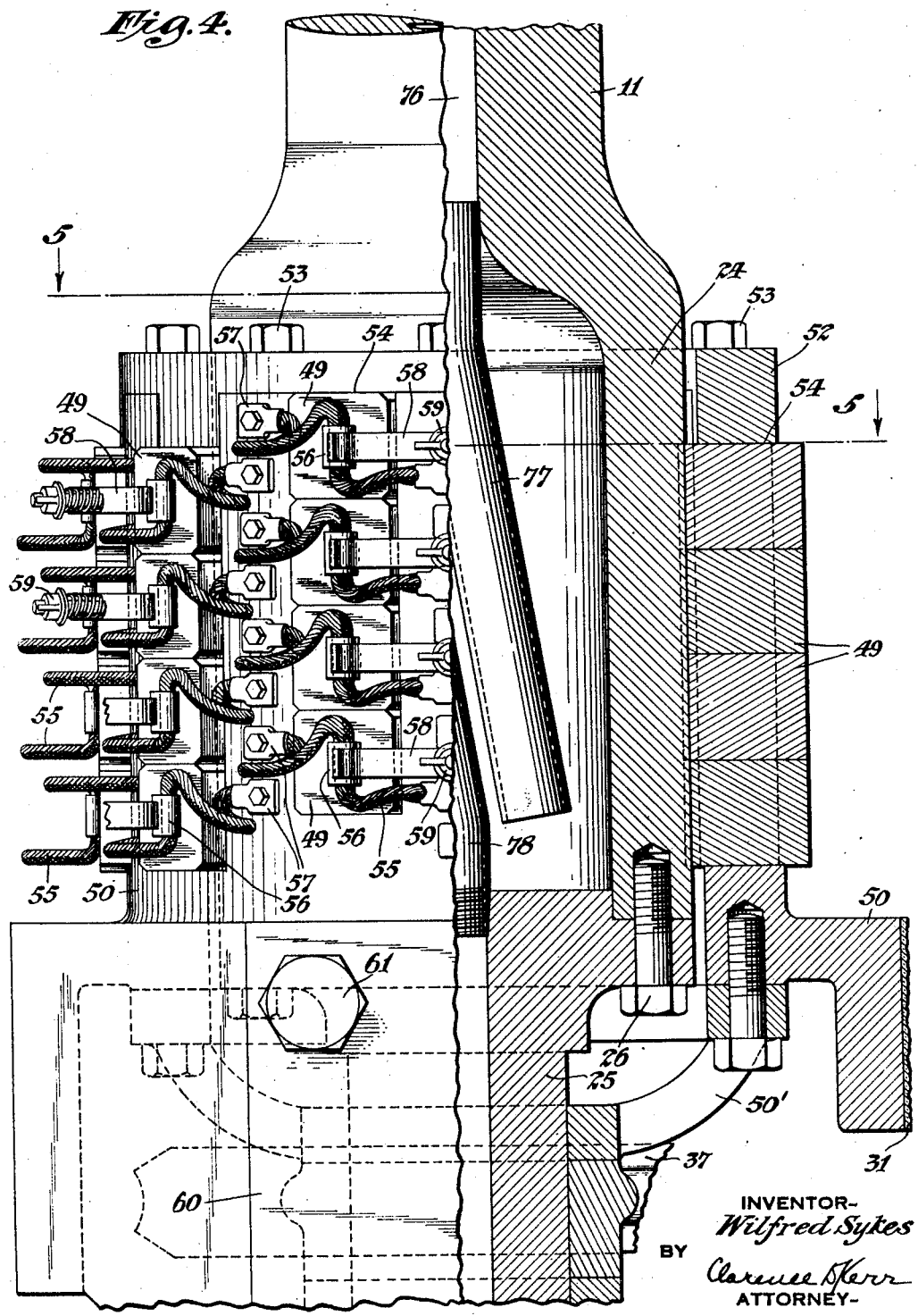
Fig. 4 is an enlarged view, partially in section, of an intermediate part of one of the welding units, showing the arrangement of the brushes about the roll shaft.
Figure 5:
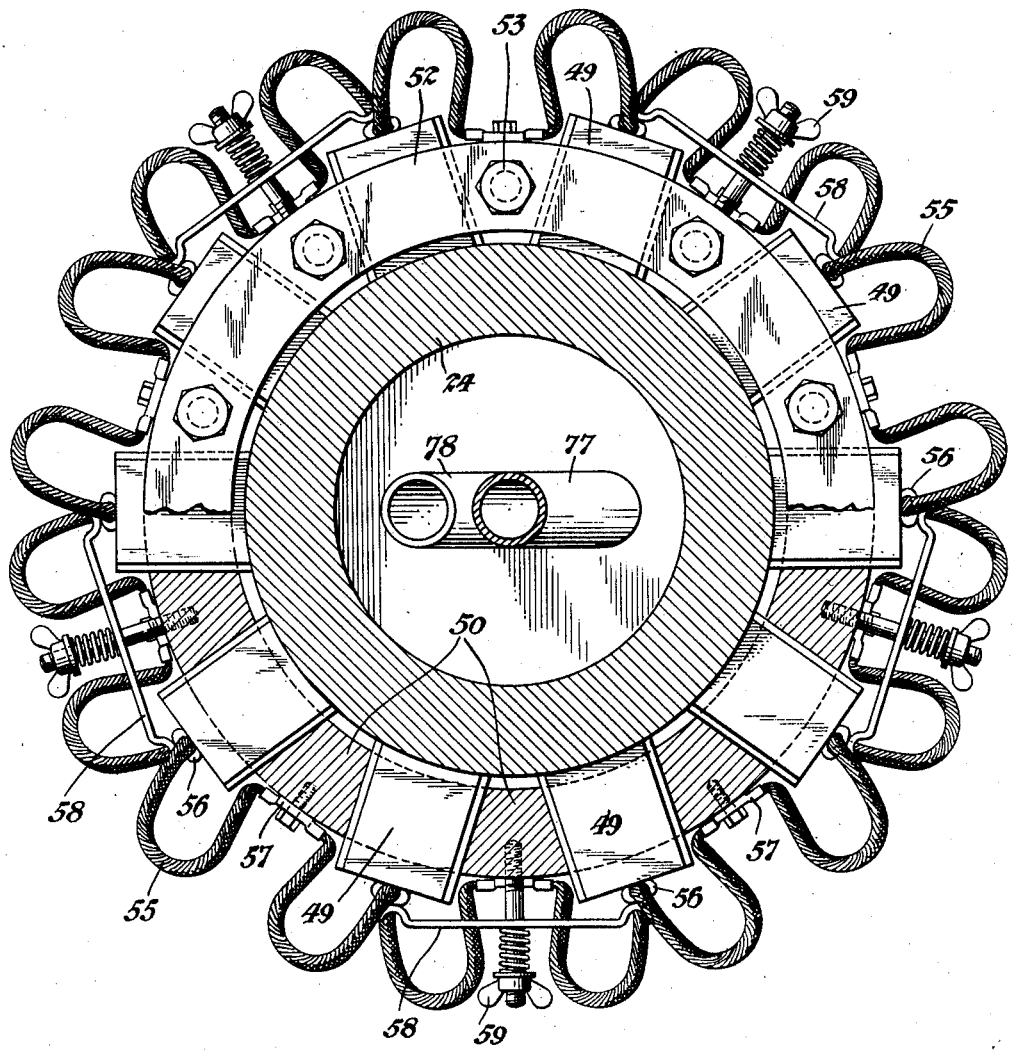

Fig. 5 further illustrates the brush arrangement, being taken substantially along the lines 5—5 of Fig. 4;

Fig. 6 illustrates another embodiment of the invention in which the currents are introduced to the welding units through a pool of mercury, one of the units being shown in section and the other in elevation;

Fig. 7 is a partial sectional view taken through one of the welding rolls illustrating the construction thereof and the cooling arrangement;

Fig. 8 is a partial sectional view taken substantially along the line 8—8 of Fig. 7; and Fig. 9 is a partial sectional view through an intermediate part of a welding unit showing, in detail, the mercury pool and cooling arrangements.

Figure 1:
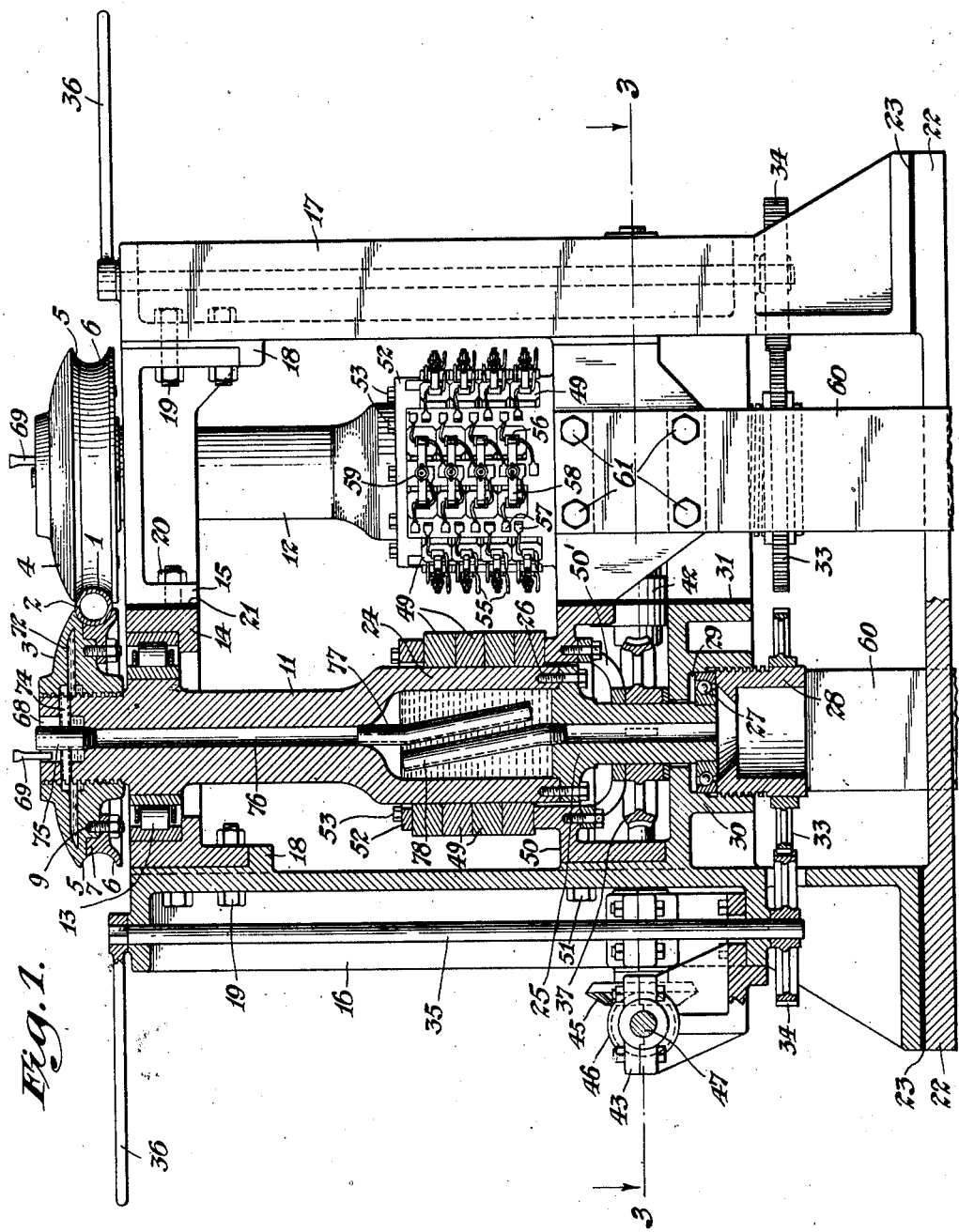
Fig. 1 illustrates one embodiment of the present invention, showing one welding unit in cross section and the other in elevation; in this form of the invention the welding currents are introduced by means of brushes contacting with the roll shaft.
Figure 2:
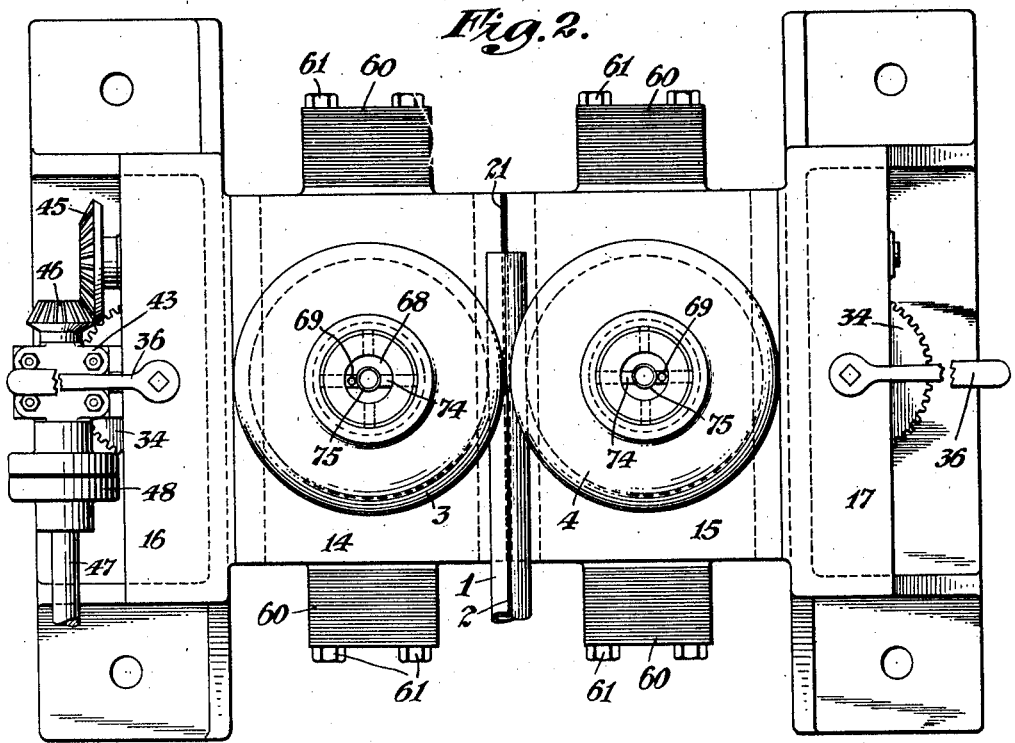
Fig. 2 is a top view of the apparatus.

Referring to Figs. 1 and 2 it will be observed that the tube blank 1, having the seam cleft 2 which is to be welded, is passed between the welding rolls 3 and 4 so that the cleft moves between the upper portions of these rolls through which the welding currents are passed during operation. It will be readily understood that the useful welding currents are those which flow from the electrode portion of one roll to the corresponding portion of the other, through the seam cleft to be welded, and that currents which flow through the tube blank in the section opposite the seam cleft do not assist the welding operation. Such currents are generally designated as leakage currents, and obviously it is desirable to reduce them to a minimum.

An improved roll construction which reduces these leakage currents considerably and which possesses the necessary mechanical strength and durability will now be described. In general, the upper part of the roll, or electrode portion, which lies adjacent the steam cleft to be welded is made of material of high electrical conductivity, for example, copper, to provide for the passage of the welding currents across this cleft, while the lower portion of the roll which supports the tube blank is made of a material which has a resistance sufficiently high so that it does not materially aid in conducting the leakage currents away from the seam cleft. Also it is preferable to make this supporting portion of the roll of relatively small cross section which also increases its resistance to the flow of leakage currents.

Referring now to Fig. 7 it will be seen that the upper, current-carrying portion 5, of the roll may be formed integral with the roll 3, which is of copper, or other suitable material. The lower, tube-supporting portion 6, comprising the greater part of the roll which contacts with the tube blank, is preferably in the form of an annulus provided with a projection 7 upon its upper surface which is inserted in a recess 8 in the roll, the annulus being secured to the roll 3 by means of the bolts 9, as illustrated. This form of construction enables the rolls to withstand large radial thrusts to which they may be subjected so that it is possible to use a ring, or annulus of comparatively small width. The cross sectional area of this member is further reduced by cutting a recess 10 in its lower face with the net result that the annulus has a higher resistance to the flow of leakage currents than it otherwise would have.

The annulus 6 may be made of a number of different materials which possess a relatively high resistance as compared with copper, of which the current carrying part of the roll is made, and which materials have sufficient mechanical strength and durability. One such material which may be employed is nichrome, consisting approximately of 70% nickel, 15% of chromium and 15% iron and impurities. This material has a resistance of about 70 times that of copper, or about 10 times that of mild steel which is generally used for making pipe or tubing. Examples of other materials which may be employed for the supporting part of the roll are (1) cast iron of the usual composition containing 3½% to 4% carbon; this would have a resistance several times that of the tube blank; (2) high carbon steel containing about .75% carbon and 1.5% manganese; (3) ferro nickel alloys containing 15% or more of nickel. All of these materials have a resistance substantially higher than that of the usual steel tube blanks which are to be welded.

The use of these and similar high resistance materials in the arrangement disclosed herein, not only simplifies the roll construction but, in addition, it avoids the use of insulating materials which are subject to injury by heat or by water. With the materials previously described, which in the case of nichrome has a resistance of approximately 10 times that of the tubing to be welded, the resistance of that part of the roll which is in parallel with the lower part of the blank, will usually be several times that of the blank itself, so that the additional leakage, as compared with a supporting section of insulating material, is negligible, and is entirely counterbalanced by the mechanical advantages obtained by using such a material.

Depending upon the thickness of the material to be welded and the diameter of the tubing, there is a large variety of comparatively high resistance materials which can be used for the supporting portion of the roll. When a tube of large diameter is to be welded, the leakage path may become relatively less important, so that a lower resistance material may be used for the supporting portion than would be desirable in a small tubing, or pipe, where the leakage path is short as compared with the path across the seam cleft.

In general, the apparatus comprises two welding units positioned on opposite sides of the tube blank. The welding currents are supplied to one of these units and after passing through the blank flows out from the other unit. These two units are clearly illustrated in Fig. 1. The welding rolls 3 and 4 are mounted upon the upper ends of the shafts 11 and 12, and if screwed thereon, as shown, it is desirable that the thread on one shaft be right hand and on the other shaft, left hand, so that both rolls will tend to become more secure upon the shafts when a tube blank is passed between them. Each shaft is supported, at its upper end, by a roller bearing 13 which is mounted in each of the brackets 14 and 15. These brackets are supported between the standards, or frames, 16 and 17, respectively, preferably resting upon shoulders 18 extending inwardly of these side frames. The brackets are bolted to each side frame by the bolts 19 and to each other by the bolts 20. Since it is necessary that the two units be electrically separated from each other, except through the tube blank, suitable insulation 21 is placed between these two brackets. Likewise the standards 16 and 17 are insulated from the base plate 22 by the insulation 23.

The shafts 11 and 12 may be, and preferably are, constructed of material possessing a high electrical conductivity, for example, copper. The welding currents are supplied to, and withdrawn from the apparatus at portions intermediate the ends of these shafts and in the arrangement of Fig. 1, these portions of the shafts are enlarged, as indicated at 24, to facilitate the making of electrical connections thereto and the removal of excess heat therefrom. Connected to the bottom of the enlarged portion 24, is a member 25, bolted thereto by the bolts 26, and constituting an extension of the shaft 11. The lower end of this member rotates within a thrust bearing 27 supported upon a rotatable threaded member, or nut 28, lying in a recess 29 in a bracket 30 which may be integral with the side frame 16. The adjacent faces of these brackets are separated by insulation 31 and the brackets are held together by the bolts 32 (see Fig. 3).

It is desirable that the welding rolls 3 and 4 be adjustable independently of each other because, under certain conditions, it may be necessary to operate the apparatus with these rolls at different heights with respect to the seam cleft to be welded. This adjustment of a roll is obtained by varying the height of the thrust bearing 27 and the nut 28. This nut is threaded into the bracket 30, as illustrated, and has mounted upon it a gear 33 in mesh with a gear 34. This latter is rotated by the shaft 35, supported by the standard 16, and provided at its upper end with a suitable handle 36. Thus each welding roll may be raised, or lowered, independently of the other, according to the direction of rotation of the handle 36.

Figure 3:
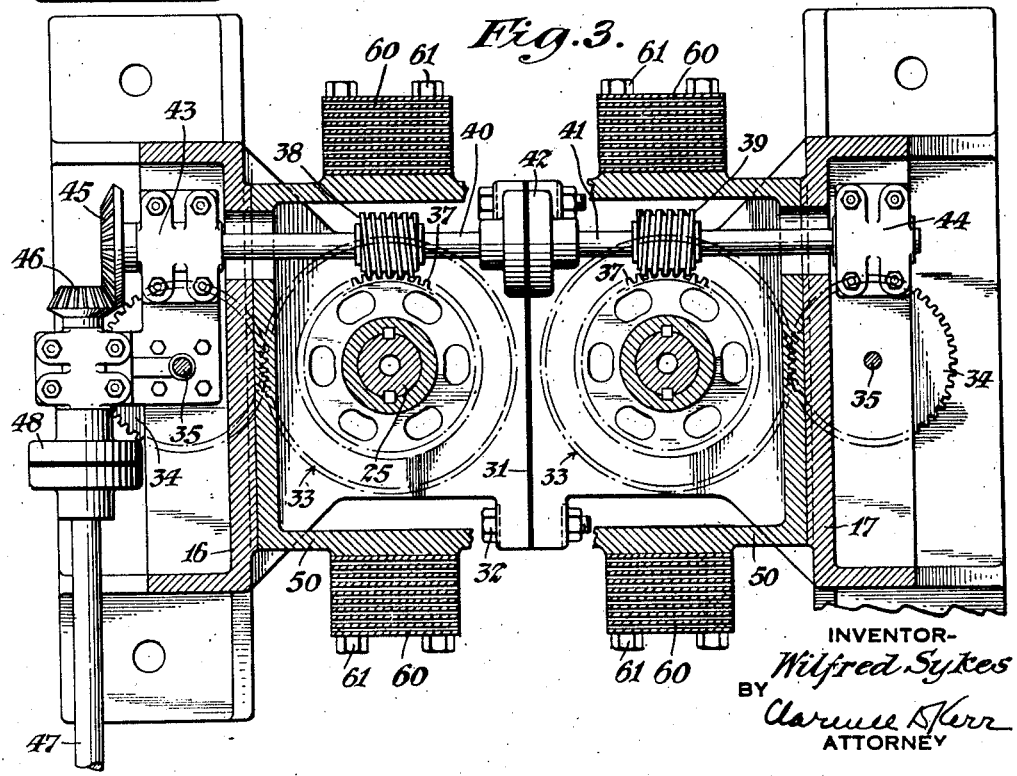
Fig. 3 is a cross sectional view taken substantially along the line 3—3 of Fig. 1.

Rotation of the welding rolls 3 and 4 is obtained by means of the following construction, reference being made to Figs. 1 and 3. Worm wheels 37 are slidably mounted, or feathered, upon the shaft members 25 and are rotated by the worms 38 and 39 which are of opposing pitches, as shown, in order to rotate the welding rolls in opposite directions as is required. The worms are mounted upon the shaft members 40 and 41, connected by the insulated coupling 42 and rotating in bearings 43 and 44. The shaft 40 has a bevel gear 45 mounted on its left hand end which engages a similar gear 46 upon the drive shaft 47. In order to insulate this apparatus from the source of power an insulated coupling 48 is inserted in the shaft 47.

The tube stock may be fed between the rollers 3, 4 in any suitable or convenient way; as for example by the usual forming rollers (not shown) which, as is well understood in the art, shape the tube blank or skelp into tubular form and cause the formed tubing to travel past the welding rolls. As is pointed out in the pending application of John F. Windsor, Serial No. 390,929, filed September 7, 1929, pitting of the rolls and tube stock may be avoided by driving the electrode rolls in a direction opposite to the travel of the stock, and is intended in the present embodiment that the shaft 47 and worms 40 and 41 shall so drive the rolls 3, 4.

One arrangement for connecting the electric circuit to the welding rolls is illustrated in Figs. 1–5, inclusive. The enlarged portion 24 of the shaft 11 has distributed around it a plurality of brushes 49, of copper or other suitable material, which are adapted to make good electrical contact with the rotating shaft. As illustrated, these brushes are slidably supported in a brush holder 50 which is secured to the side frame 16 by bolts as indicated at 51 (see Fig. 1). This brush holder has in it a plurality of radial slots in which the brushes are inserted and on top of the brush holder is a plate or crown 52, secured to the brush holder by the bolts 53, and of varying thickness so that it contacts up the upper brush in each slot, as indicated at 54, even though the sets of brushes are arranged at different levels, and thus clamps the brushes in position. The welding currents are supplied to each brush from the sections of the brush holder adjoining the brush and also through the cables 55 which contact with the brushes at the points 56 and with the brush holder at the terminals 57. Thus the supply of current to the brushes is not dependent solely upon the sliding contacts between the brushes and the brush holder. Pairs of adjacent brushes are urged radially inward by the spring pressed bars 58, the pressures on which are adjustable by the wing nuts 59. The brush holder 50 is connected to the source of current supply through the leads 60 comprising flat strips of conducting material, preferably copper, bolted to the brush holder, as indicated at 61 (see Figs. 2 and 3). A spider 50' secured to and depending from the stationary brush holder 50 is adapted to engage the hub of the associated worm wheel 37 as shown and to maintain said wheel in proper relation to the cooperating worm gear notwithstanding raising of the shaft 25 with respect to said worm wheel by operation of the nut 28.

Another arrangement for connecting the roll shafts with the current supply is illustrated in Figs. 6 and 9. Here the roll shaft has associated with it a conducting member 62, preferably of iron, or soft steel and threaded or otherwise fastened to the roll shaft. The lower part of this member is provided with an enlarged annular projection 63 which projects a substantial distance within a slightly wider annular recess 64 in the terminal member 65, surrounding the roll shaft and secured to the side frame. The recess 64 is filled with mercury, or other suitable conducting fluid, which readily conducts current from the terminal member 65 to the member 62 whence the current flows to the welding roll. An apron 66 may be provided to prevent foreign substances from getting into the mercury. As before, the welding currents are supplied to the terminal member 65 through the leads 67. In this arrangement the detailed construction of the roll shaft is slightly modified but the means for rotating the shaft and for raising and lowering it are substantially the same as those previously described and will be clearly understood from the drawings.

It will, of course, be understood that the welding rolls 3 and 4 may become excessively hot unless means are provided to remove the excess heat. Referring to Figs. 1, 6 and 7, a simple and efficient cooling system is shown. The upper end of the shaft 11 is recessed as indicated at 68 and cooling water is fed into this recess through the pipe 69. The water flows through the diametrically opposite holes 70 in the shaft and into the recess 71 in the welding roll 3, which recess communicates with another, 72, having a large lateral extension in the roll. The water is discharged from a recess 73, through the pipes 74 which are located between the entrance openings 70, into a central pipe 75 communicating with the interior 76 of the roll shaft but not with the recess 68 in the shaft.

In the arrangement using the brushes to supply current as in Fig. 1, the water discharged from the roll cooling system, just described, flows through a pipe 77 into the enlarged portion 24 of the roller shaft 11 and is discharged through the overflow pipe 78 and the shaft member 25 from which it is carried away by any convenient means (not shown). When the mercury arrangement is used, as in Fig. 9, the water discharged from the welding rolls flows directly through the roll shaft. The portion of the shaft in the region of the mercury pool and the terminal member 65 are cooled by a separate water jacket 79 in this terminal member; water is supplied through pipe 80 and drawn off through the discharge pipe 81.

It should be understood that the present invention is not to be limited to the specific forms and arrangements of parts illustrated and described herein for various changes may be made without departing from the spirit and scope of the present invention.

What I claim is:

1. In a welding machine, in combination, a welding roll, a shaft upon which said roll is mounted and adapted to conduct current thereto and means for supplying current to said shaft comprising, a stationary terminal member encompassing the shaft at an intermediate point and having an annular recess therein containing a conducting fluid, a member mounted upon said shaft and provided with an annular projection extending a substantial distance into said recess and adapted to rotate in said conducting fluid, and supply leads from the source of power to said terminal member.

2. In a welding machine, in combination, a welding roll, a shaft upon which said roll is mounted and adapted to conduct current thereto and means for supplying current to said shaft comprising, a stationary terminal member encompassing the shaft at an intermediate point and having an annular recess therein removed from said shaft, a conducting member mounted upon said shaft and provided with an annular projection extending a substantial distance into said recess and adapted to rotate therein, the space between said projection and the recess being substantially filled with mercury, and supply leads from the source of power to said terminal member.

3. In a welding machine, in combination, a welding roll, a vertical shaft upon which said roll is mounted and adapted to conduct current thereto, means for supplying current to said shaft and means for moving said roll axially, said shaft being slidably supported in the machine upon a threaded member which is rotatable to raise and lower said shaft and means for rotating said member.

4. In a welding machine, in combination, a plurality of welding rolls, shafts upon which said rolls are mounted and electrically connected thereto, means for supplying and withdrawing current from said shafts, means for rotating said shafts comprising worm wheels mounted upon said shafts and a worm shaft having thereon worms of opposing pitches engaging said worm wheels, and means for adjusting the rolls axially with respect to each other, comprising threaded members upon which each of said shafts is supported, said members when rotated raising or lowering the respective shafts and means for rotating said members independently of each other in either direction.

5. In a welding machine, in combination, a welding roll, a shaft upon which said roll is mounted and adapted to conduct current thereto, means for supplying current to said shaft and means for removing excess heat from said rolls and the current supply means, the last named means comprising conduits for supplying a cooling fluid to the interior of said roll from a recess in said shaft adjacent the roll, fluid reservoir means in said shaft opposite said current supplying means, conduit means for removing said fluid from the roll discharging it through a portion of said shaft into said reservoir, and means for discharging fluid from said reservoir.

6. In a welding machine, in combination, a welding roll, a shaft upon which said roll is mounted and adapted to conduct current thereto, means for supplying current to said shaft and means for removing excess heat from said rolls and the current supply means, the last named means comprising, conduits for supplying a cooling fluid to a recess in the interior of said roll from a recess in said shaft adjacent the roll, conduits for removing said fluid from said roll recess to a discharge pipe located within said shaft recess but not communicating with the fluid therein, the fluid flowing from said discharge pipe being discharged through said shaft past the current supply means.

7. In a welding machine, in combination, a welding roll, a shaft upon which said roll is mounted and adapted to conduct current thereto, means for supplying current to said shaft and means for removing excess heat from said rolls and the current supply means, the last named means comprising, conduits for supplying a cooling fluid to a recess in the interior of said roll from a recess in said shaft adjacent the roll, conduits for removing said fluid from said roll recess to a discharge pipe located within said shaft recess but not communicating with the fluid therein, the fluid flowing from said discharge pipe through the shaft to a pipe opening near the bottom of that portion of the shaft adjacent the current supply means and another pipe having an opening above said pipe opening whereby a reservoir of cooling fluid is maintained within said shaft adjacent the current supply means.

8. In a welding machine, in combination, a welding roll, a shaft upon which said roll is mounted and adapted to conduct current thereto, said shaft having an enlarged portion intermediate its ends, means adjacent said enlarged portion for supplying current to said shaft and means for removing excess heat from said rolls and the current supply means, the last named means comprising a plurality of conduits for supplying a cooling fluid to a recess in the interior of said roll from a recess in said shaft adjacent the roll, conduits located between the first named conduits for removing said fluid from the roll recess to a discharge pipe located within said shaft recess but not communicating with the fluid therein, the fluid flowing from said discharge pipe through the shaft to a pipe opening near the bottom of said shaft enlargement and another pipe having an opening above said pipe opening whereby a reservoir of cooling fluid is maintained within said shaft enlargement.

9. In a welding machine, in combination, a welding roll, a shaft upon which said roll is mounted and adapted to conduct current thereto, a member adapted to supply current to said shaft and means for removing excess heat from said roll and said member comprising, conduits for supplying a cooling fluid to a recess in the interior of said roll from a recess in said shaft adjacent the roll, conduits for removing said fluid from said roll recess to a discharge pipe located within said shaft recess but not communicating with the fluid therein, the fluid flowing from said discharge pipe being discharged through said shaft past the current supplying member and a separate water jacket in said member surrounding the shaft.

10. A welding roll comprising a metallic electrode portion having a recess therein, a tube supporting portion of a metal having a substantially higher resistance than that of said electrode portion, said tube supporting portion comprising an annular member having means projecting upwardly therefrom into said recess and means for securing said member to said electrode portion.

11. A welding roll comprising a metallic electrode portion having a recess therein, a tube supporting portion comprising an annular member of a metal having a substantially higher resistance than that of said electrode portion, means projecting upwardly from said annular member into said recess, said annular member also having a recessed lower portion, and means securing said member to said electrode portion.

12. A welding roll comprising a metallic electrode portion having a circumferential surface grooved for engagement with a portion of the periphery of a tube blank, a tube supporting portion comprising an annular member having a circumferential surface curved for engagement with another part of the periphery of said blank along an arc greater than that engaged by the surface of said electrode portion, said annular member being composed of a metal having a substantially higher resistance than that of said electrode portion, a flange on said member engaging a recess in said electrode portion, and means securing said member to said electrode portion.

13. In combination, a welding roll comprising a metallic electrode portion having a circumferential surface grooved for engagement with a portion of the periphery of a tube blank, a shaft on which said roll is mounted, said electrode portion having an annular recess below said grooved circumferential surface, an annular member of a metal having a resistance substantially greater than that of said electrode portion, said annular member being provided with an annular flange extending into said recess and bearing against a surface of said electrode portion extending axially of said shaft, a portion of said member below said surface extending inwardly toward said shaft, said annular member also having a circumferential surface grooved to engage said tube blank, and means for securing said member to said electrode portion, said means engaging said inwardly extending portion of said member.

WILFRED SYKES.